United States Patent
Shechter

(10) Patent No.: US 9,189,832 B2
(45) Date of Patent: Nov. 17, 2015

(54) METHOD AND SYSTEM FOR NOISE REDUCTION IN LOW DOSE COMPUTED TOMOGRAPHY

(75) Inventor: Gilad Shechter, Haifa (IL)

(73) Assignee: Koninklijke Philips N.V., Eindhoven (NL)

( * ) Notice: Subject to any disclaimer, the term of this patent is extended or adjusted under 35 U.S.C. 154(b) by 328 days.

(21) Appl. No.: 13/703,721

(22) PCT Filed: Apr. 27, 2011

(86) PCT No.: PCT/IB2011/051846
§ 371 (c)(1),
(2), (4) Date: Dec. 12, 2012

(87) PCT Pub. No.: WO2011/161557
PCT Pub. Date: Dec. 29, 2011

(65) Prior Publication Data
US 2013/0089252 A1 Apr. 11, 2013

Related U.S. Application Data

(60) Provisional application No. 61/356,817, filed on Jun. 21, 2010.

(51) Int. Cl.
*G06K 9/00* (2006.01)
*G06T 5/00* (2006.01)
*G06T 11/00* (2006.01)

(52) U.S. Cl.
CPC ........... *G06T 5/002* (2013.01); *G06T 11/005* (2013.01); *G06T 11/008* (2013.01); *G06T 2207/10081* (2013.01); *G06T 2207/30004* (2013.01)

(58) Field of Classification Search
None
See application file for complete search history.

(56) References Cited

U.S. PATENT DOCUMENTS

| | | | |
|---|---|---|---|
| 4,761,819 A | 8/1988 | Denison et al. | |
| 7,362,845 B2 * | 4/2008 | Ning | 378/4 |
| 7,558,362 B2 * | 7/2009 | Shechter et al. | 378/4 |
| 8,938,108 B2 * | 1/2015 | Brown et al. | 382/131 |
| 2003/0076988 A1 | 4/2003 | Liang et al. | |
| 2007/0053477 A1 * | 3/2007 | Ning | 378/4 |
| 2007/0140407 A1 * | 6/2007 | Chen et al. | 378/4 |
| 2007/0189635 A1 * | 8/2007 | Borsdorf et al. | 382/275 |

(Continued)

FOREIGN PATENT DOCUMENTS

WO 2008012754 A2 1/2008

OTHER PUBLICATIONS

Tomasi et al., Bilateral Filtering for Gray and Color Images, Proceedings of the 1998 IEEE International Conference on Computer Vision Bombay India, 1998, 8 sheets.
Rudin, et al., Nonlinear total variation based noise removal algorithms, Physica D, 1992, pp. 259-268, vol. 60.

(Continued)

*Primary Examiner* — Jason Heidemann

(57) ABSTRACT

A method includes de-noising projection data from a lower dose scan in the projection domain, reconstructing the de-noised projection data to generate volumetric image data, and de-noising the volumetric image data in the image domain. A system includes a projection domain processor (116) that de-noises projection data from a lower dose scan, a reconstructor (118) that reconstructs the de-noised projection data and generates image data, and an image domain processor (120) that de-noises the image data such that a noise level of the de-noise image data is substantially the same as an estimated image data noise level of image data for a higher dose scan.

20 Claims, 3 Drawing Sheets

(56) References Cited

U.S. PATENT DOCUMENTS

| | | | |
|---|---|---|---|
| 2008/0025592 A1* | 1/2008 | Jerebko et al. | 382/132 |
| 2008/0069294 A1* | 3/2008 | Wigstrom et al. | 378/4 |
| 2008/0267484 A1 | 10/2008 | Chen | |
| 2011/0019935 A1* | 1/2011 | Kelm et al. | 382/275 |
| 2011/0110573 A1* | 5/2011 | Wiegert et al. | 382/131 |
| 2011/0164799 A1* | 7/2011 | Miao et al. | 382/131 |
| 2011/0243412 A1* | 10/2011 | Grass et al. | 382/131 |
| 2011/0262022 A1* | 10/2011 | Lee | 382/131 |
| 2011/0268328 A1* | 11/2011 | Bar-Aviv et al. | 382/128 |
| 2011/0286646 A1* | 11/2011 | Chen et al. | 382/131 |
| 2012/0019512 A1* | 1/2012 | Yang et al. | 345/419 |
| 2012/0183194 A1* | 7/2012 | Brown et al. | 382/131 |
| 2012/0308104 A1* | 12/2012 | Yang et al. | 382/131 |

OTHER PUBLICATIONS

Koken et al., Aperture weighted cardiac reconstruction for cone-beam CT, Physics in Medicine and Biology, 2006, pp. 3433-3448, vol. 51.

Lu, H., et al.; Adaptive Noise Reduction toward Low-dose Computed Tomography; 2003; Proc. of SPIE-Int'l. Society for Optical Engineering; pp. 759-766.

Marin, D., et al.; Low-Tube-Voltage, High-Tube-Current Multidetector Abdominal CT: Improved Image Quality and Decreased Radiation Dose with Adaptive Statistical Iterative Reconstruction Algorithm-Initial Clinical Experience; 2010; Radiology; 254(1)145-153.

Forthmann, P., et al.; Penalized maximum-likelihood sinogram restoration for dual focal spot computed tomography; 2007; Phys. Med. Biol.; 52(15)4513-4523.

\* cited by examiner

METHOD AND SYSTEM FOR NOISE REDUCTION IN LOW DOSE COMPUTED TOMOGRAPHY

CROSS REFERENCE TO RELATED APPLICATIONS

This application is a national filing of PCT application Serial No. PCT/IB2011/051846, filed Apr. 27, 2011, published as WO 2011/161557 A1 on Dec. 29, 2011, which claims the benefit of U.S. provisional application Ser. No. 61/356,817 filed Jun. 21, 2010, which is incorporated herein by reference.

The following generally relates to computed tomography (CT), and finds particular application to CT data acquisition and reconstruction, and more particularly to low dose CT.

CT scanners emit ionizing radiation, which can cause damage to living tissue, resulting in increasing risk of cancer, tumors and genetic damage at typical doses, and might cause skin burns and/or hair loss at high doses. For example, the literature has indicated that a CT examination with an effective dose of ten (10) milliSievert (mSv) may be associated with an increase in the likelihood of fatal cancer by approximately one (1) chance in two thousand (2000).

Various approaches have been proposed in the literature to reduce patient exposure to ionizing radiation (i.e., reduce patient dose) during a CT examination. One approach proposed in the literature is to employ an ultralow-dose technique for CT examinations of less than or sub-mSv. Unfortunately, ultralow-dose techniques of sub-mSv may result in non-diagnostic quality CT images with high levels of noise (i.e. low signal-to-noise) and pattern noise artifacts.

In order to turn such images into clinically acceptable images, a dramatic noise reduction equivalent to a dose increase of the order of one thousand percent (1000%) or more is required. Unfortunately, present non-iterative image domain de-noising algorithms in the literature are designed to reduce the noise in equivalence to a dose increase of up to about two hundred percent (200%). Thus, the resulting CT images have lower image quality (more noise) than images performed using a conventional scanning technique with an effective dose of 10 mSv. Iterative methods require a long reconstruction time and for an aggressive de-noising, might lead to non-natural image noise patterns.

In view of the above, there is an unresolved need for other ultralow-dose techniques for CT examinations.

Aspects of the present application address the above-referenced matters and others.

According to one aspect, a method includes de-noising projection data from a lower dose scan in the projection domain, reconstructing the de-noised projection data to generate volumetric image data, and de-noising the volumetric image data in the image domain.

According to another aspect, a system includes a projection domain processor that de-noises projection data from a lower dose scan, a reconstructor that reconstructs the de-noised projection data and generates image data, and an image domain processor that de-noises the image data such that a noise level of the de-noised image data is substantially the same as an estimated image data noise level of image data for a higher dose scan.

According to another aspect, a computer readable storage medium encoded with instructions which, when executed by a processor of a computer, cause the processor to: employ projection domain and image domain de-noising to produce image data from a lower dose scan that has a noise level substantially the same as a noise level of a higher dose scan.

The invention may take form in various components and arrangements of components, and in various steps and arrangements of steps. The drawings are only for purposes of illustrating the preferred embodiments and are not to be construed as limiting the invention.

Figure 1:
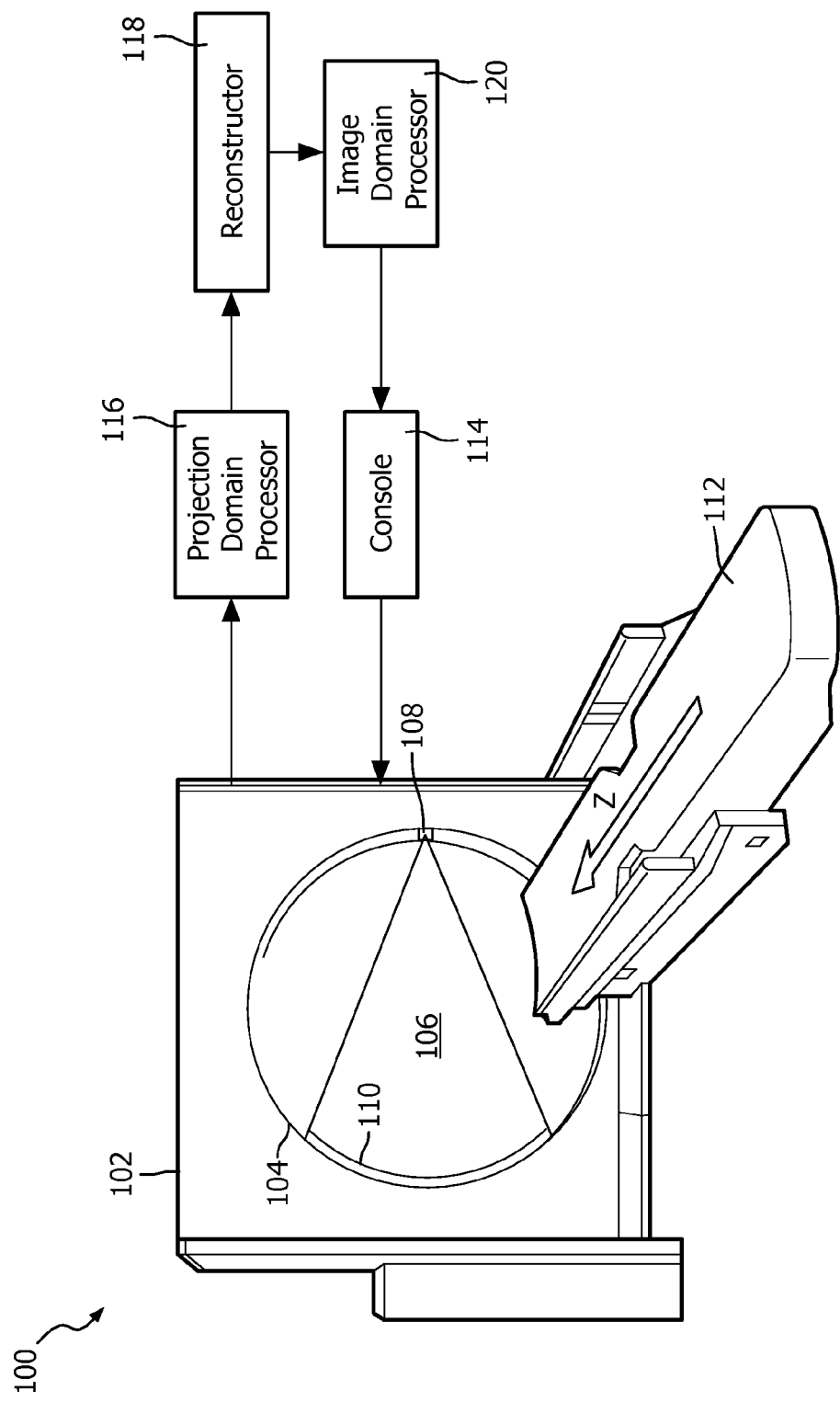
FIG. 1 illustrates an imaging system in connection with a projection domain processor and an image domain processor.

FIG. 1 illustrates an imaging system 100 such as a computed tomography (CT) scanner. The imaging system 100 includes a stationary gantry 102 and a rotating gantry 104, which is rotatably supported by the stationary gantry 102. The rotating gantry 104 rotates around an examination region 106 about a longitudinal or z-axis.

A radiation source 108, such as an x-ray tube, is supported by the rotating gantry 104 and rotates with the rotating gantry 104, and emits radiation. The radiation source 108 is configured for performing higher and lower dose scans.

A radiation sensitive detector array 110 located opposite the source 108 detects radiation that traverses the examination region 106 and generates projection data indicative thereof. The radiation sensitive detector array 110 may include one or more rows of radiation sensitive pixels elements.

A support 112, such as a couch, supports a subject in the examination region 106. The support 112 can be used to variously position the subject with respect to x, y, and/or z axes before, during and/or after scanning.

A general purpose computing system serves as an operator console 114, which includes human readable output devices such as a display and/or printer and input devices such as a keyboard and/or mouse. Software resident on the console 114 allows the operator to control the operation of the system 100, for example, allowing the operator to select a low dose technique (e.g., sub-mSv), projection domain processing algorithm, reconstruction algorithm, image domain processing algorithm, etc.

A projection domain processor 116 processes the projection data generated by the radiation sensitive detector array 110, a reconstructor 118 reconstructs projection data processed by the projection domain processor 116 and generates volumetric image data indicative of the examination region 106, and an image domain processor 120 processes the volumetric image data generated by the reconstructor 118.

As described in greater detail below, with respect to lower dose scans, a suitable projection domain processing includes adaptively de-noising the projection data, and suitable image domain processing includes de-noising the image data so that the noise level of the de-noised image matches the noise level that would have been obtained by performing a target higher dose scan instead of the lower dose scan.

Such projection and image domain de-noising allows for scans at sub-mSv (ultra-low) dose levels, while producing images with noise levels of higher dose scans (e.g., mSv and higher). Such scans are well-suited for procedures such as brain scans, calcium scoring screening scans, pediatric scans, and/or other scans. Such scans may also mitigate, reduce, and/or replace scout scan.

It is to be appreciated that the projection domain processor 116 and/or the image domain processor 120 may be part of the reconstructor 118. Furthermore, one or more of the projection domain processor 116, the reconstructor 118, or the image domain processor 120 may be remote from the system 100, for example, in a computing system such as a workstation or the like. Moreover, one or more processors may execute computer readable instructions encoded and/or embodied on local or remote computer readable storage medium such as memory to implement one or more of the projection domain processor 116, the reconstructor 118, or the image domain processor 120.

Figure 2:
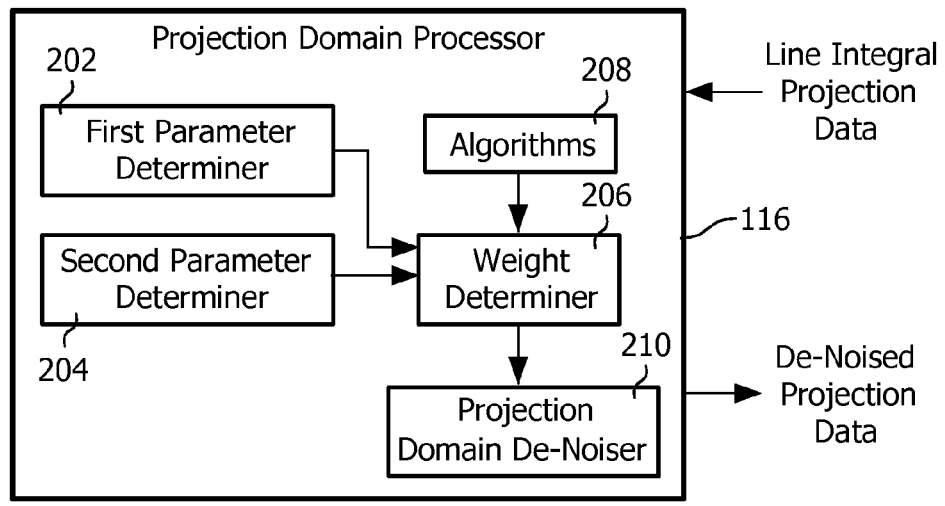
FIG. 2 illustrates an example projection domain processor.

FIG. 2 illustrates an example projection domain processor 116.

The input of the processor 116 are projection readings describing line integrals of the X-ray attenuation coefficients through the scanned patient. For acquisitions that include dynamic focal spot, the projection domain processor 116 can process separately the readings of each different focal spot, or, alternatively to process them together after interleaving them with each other.

A first parameter determiner 202 determines a first parameter of the projection data. In the illustrated embodiment, the first parameter includes a noise variance of the projection data. A second parameter determiner 204 determines a second parameter of the projection data. In the illustrated embodiment, the second parameter includes a variation of the projection data, which can be estimated according to a gradient scalar product or otherwise determined.

A weight generator 206 generates de-noising weights based at least on the first and second parameters and one or more algorithms 208. By way of example, where the first and second parameters indicate projection data includes lower local noise variance and higher local variation, the weight generator 206 employs an algorithm to generate a weight that decreases more rapidly with distance between neighbor projection readings and the reading to be interpolated. In another example, where the first and second parameters indicate projection data includes higher local noise variance and lower local variation, the weight generator 206 employs an algorithm to generate a weight that decreases more slowly with distance between neighbor projection readings and the reading to be interpolated.

A projection domain de-noiser 210 applies the weights to de-noise the projection data. In one instance, this effectively results in replacing each projection by a weighted sum of the original readings within its three-dimensional neighborhood. Generally, this results in aggressive de-noising of higher noise projections that do not include structure of interest, intermediate de-noising of higher noise projections that include structure of interest, and light de-noising of lower noise projections that include structure of interest. By adaptively de-noising the projection as such, blurring of image details for a given image de-noising can be mitigated.

In one embodiment, the projection domain de-noiser 210 applies the weights as shown in EQUATION 1:

$$p^d(i) = \sum_{n \in neighbourhood(i)} W(n) \cdot p(n) \quad \text{EQUATION 1}$$

where $p^d(i)$ represents the interpolated de-noised reading, $p(n)$ represents the noisy projection data in the neighborhood of the reading i, and W(n) represents the adaptive weights. This essentially replaces each original projection reading with a weighted sum of the original projection readings within a predetermined neighborhood about the original projection reading. The adaptive weights W(n) can be determined based on EQUATION 2:

$$W(n) = w(n) \bigg/ \sum_{n \in neighbourhood(i)} W(n) \quad \text{EQUATION 2}$$

where w(n) represents the non-normalized weights of the weighted sum.

In a non-limiting embodiment, the parameter w(n) can be determined based on EQUATION 3:

$$w(n) = \sqrt{\exp\left(-\frac{r^2}{2 \cdot \sigma^2}\right)} + \alpha \cdot \delta_{i,n} \quad \text{EQUATION 3}$$

where r represents distance between the neighbor n and the reading i, and σ is the parameter that determines the aggressiveness of the smoothing.

In a non-limiting embodiment, the parameter σ can be determined based on EQUATION 4:

$$\sigma(s, v) = \max\left(\sigma_0 + \frac{s}{s_0} - \frac{v}{v_0}, \sigma_{min}\right) \quad \text{EQUATION 4}$$

where $\tau_0$ defines the minimal decrease of the weights with the distance, s represents the estimated local variation, $s_0$ represents a medium value of the local variations calculated at different regions within the projection domain, v represents the noise variance, $v_0$ represents a medium value of the local noise variance values calculated at different regions within the projection domain.

To minimize the blurring of diagnostic details, $s_0$ and $v_0$ are assigned values that maximize the variation of a between different locations in the projection domain. Unlike σ the parameter α is independent of s and v. This allows controlling the de-noising aggressiveness and maintaining a high weight dependency on s and v at the same time.

Figure 3:
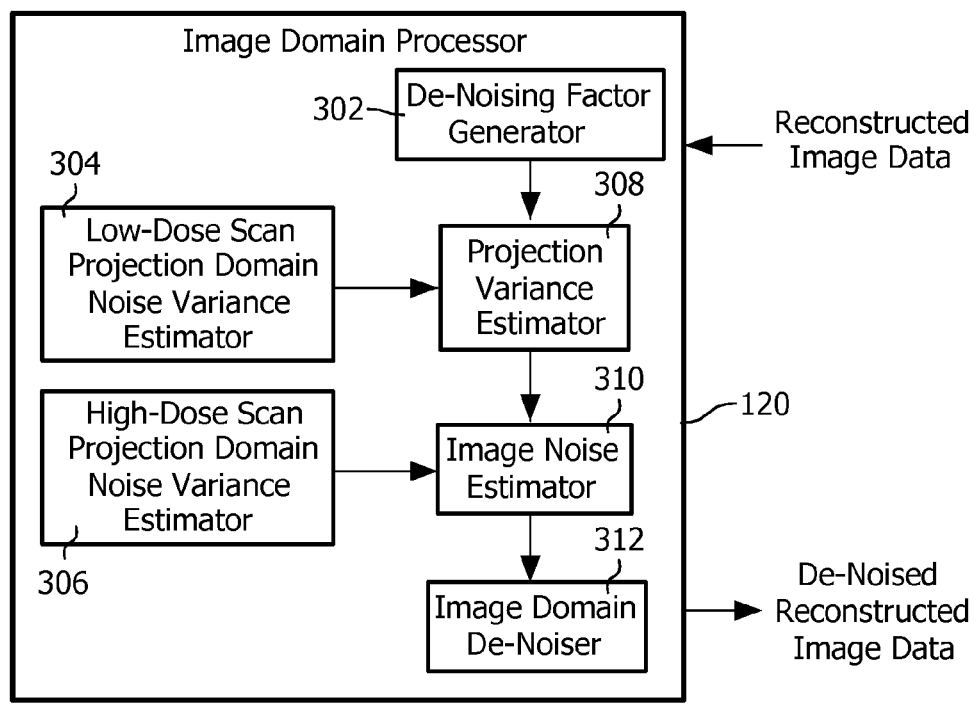
FIG. 3 illustrates an example image domain processor.

FIG. 3 illustrates an example image domain processor 120.

A projection domain noise variance determiner 304 determines a noise variance for projection data of the lower dose scan. A projection data noise variance estimator 306 estimates a noise variance for projection data that would have been generated had a target higher dose scan been performed.

A de-noising factor generator 302 generates a de-noising factor. The illustrated de-noising factor generator 302 takes into account detector crosstalk.

A projection variance estimator 308 estimates a projection variance for the lower dose scan based on the noise variance estimated by 304 and the de-noising factor.

An image noise estimator 310 estimates an image noise for the lower dose scan based on the corresponding projection variance and an image noise for the higher dose scan based on the corresponding projection variance.

An image domain de-noiser 312 de-noises the image data based on the image noise for the lower dose scan and the image noise for the higher dose.

In one embodiment, the above noted de-noising factor can be generated by the de-noising factor generator 302 as shown in EQUATION 5

$$F(i) = \sum_{n \in neighbourhood(i)} W(n)^2, \quad \text{EQUATION 5}$$

where F(i) represents the de-noising factor.

The projection variances for the lower dose scan and the higher dose scan respectively can be estimated by the estimated projection readings variance and the de-noising factors through EQUATIONS 6 and 7:

$$V_P(P) = \sum_{i \in subset} F(i) \cdot V(i), \text{ and} \quad \text{EQUATION 6}$$

$$V_P^T(P) = \sum_{i \in subset} V^T(i), \quad \text{EQUATION 7}$$

where $V_P(P)$ represents the projection variance for the lower dose scan, $V(i)$ represents local noise variance of the lower dose scan, $V_P^T(P)$ represents the projection variance for the higher dose scan, and $V^T(i)$ represents the local noise variance for the higher dose scan. The projection-dependent scalar variance values may be generated for each projection by performing the summation over a subset thereof, for example, for a predetermined group (e.g., 150, 200, 300, etc.) of central readings belonging to a central projection row.

For aperture weighted filtered back-projection, the noise variance values at gantry rotation center obtained for the projection de-noised lower dose scan image data and for the higher dose scan image data respectively can be determined through EQUATIONS 8 and 9:

$$V_I(I) = C \cdot \sum_P W_{BP}(I, P)^2 \cdot V_P(P), \text{ and} \quad \text{EQUATION 8}$$

$$V_I^T(I) = C \cdot \sum_P W_{BP}(I, P)^2 \cdot V_P^T(P), \quad \text{EQUATION 9}$$

where C is a constant for a given set of reconstruction parameters, and I denotes different axial images.

The image domain de-noising applied by the image domain de-noiser 312 can be determined as shown in EQUATION 10:

$$VR_I(I) = \frac{V_I^T(I)}{V_I(I)}, \quad \text{EQUATION 9}$$

where VR(I) represents the image domain de-noising and is transferred to the complementary image domain de-noising algorithm.

Using VR(I) as an input, the image domain de-noiser 312 de-noises the image data so that the noise level of each axial image reconstructed from the de-noised projections matches noise level that would have been obtained by performing the higher dose scan instead of the ultralow-dose scan.

Figure 4:
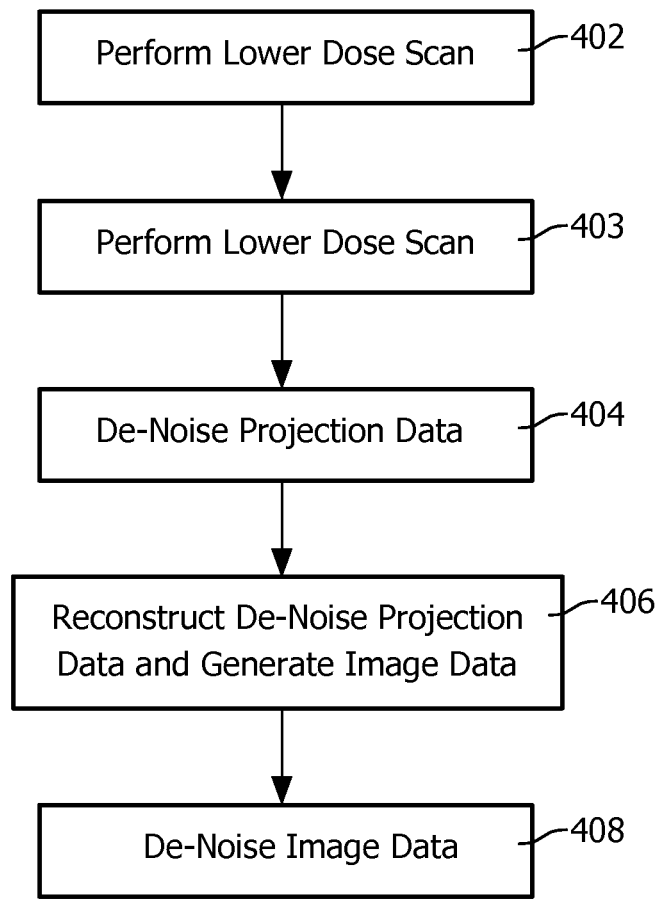
FIG. 4 illustrates an example method.

FIG. 4 illustrates a method for generating images with noise levels of higher dose scans from lower dose scans.

At 402, a lower dose scan (e.g., 10 mAs) is performed on a subject. As described herein, such a scan may correspond to a scan with an effective dose of sub-mSv.

At 403, line integrals of the X-ray attenuation coefficients are calculated in the projection domain.

At 404, the projection data of line integrals is de-noised. As described herein, suitable projection domain de-noising includes adaptively de-noising the projection data such that projection data having lower local noise variance and higher local variation are de-noised less than projection data having higher local noise variance and lower local variation are de-noised.

At 406, the de-noised projection data is reconstructed to generate image data.

At 408, the image data is de-noised. As described herein, suitable image domain de-noising includes de-noising the data such that the noise level of the de-noise image data is substantially similar to the noise level of a target higher dose scan (e.g., 100 mAs).

The above described acts may be implemented by way of computer readable instructions, which, when executed by a computer processor(s), causes the processor(s) to carry out the acts described herein. In such a case, the instructions are stored in a computer readable storage medium such as memory associated with and/or otherwise accessible to the relevant computer.

The invention has been described with reference to the preferred embodiments. Modifications and alterations may occur to others upon reading and understanding the preceding detailed description. It is intended that the invention be construed as including all such modifications and alterations insofar as they come within the scope of the appended claims or the equivalents thereof.

What is claimed is:

1. A method, comprising:
   de-noising projection data from a lower dose scan in the projection domain, wherein the lower dose scan corresponds to a scan which produces image data with a noise level that is higher than a predetermined target image data noise level;
   reconstructing the de-noised projection data to generate volumetric image data;
   determining a noise level of the image data;
   estimating a noise level for the image data of the higher dose scan;
   determining a ratio of the noise level of the higher dose scan to the noise level of the image of the lower dose scan; and
   de-noising the volumetric image data in the image domain based on the ratio.

2. The method of claim 1, wherein the de-noised image data has a noise level the same as the predetermined target image data noise level.

3. The method of claim 1, wherein the lower dose scan has an effective dose of sub-mSv and the higher dose scan has an effective dose of ten mSv or higher.

4. The method of claim 1, further comprising:
   adaptively de-noising the projection data based on a local noise variance and a local variation.

5. The method of claim 4, wherein projection data having a lower local noise variance and a higher local variation are de-noised less than projection data having a higher local noise variance and a lower local variation are de-noised.

6. The method of claim 1, wherein the de-noising in the projection domain is non-iterative de-noising.

7. The method of claim 1, wherein the de-noising in the projection domain mitigates blurring of image details.

8. A system, comprising:
   a first parameter determiner that determines a noise variance of projection data from a lower dose scan;
   a second parameter determiner that determines a variation of the projection data, wherein the variation is estimated based on a gradient scalar product;
   a projection domain processor that de-noises the projection data based on the noise variance and the variation;
   a reconstructor that reconstructs the de-noised projection data and generates image data; and
   an image domain processor that de-noises the image data.

9. The system of claim 8, wherein a noise level of the de-noised image data is approximately the same as an estimated image data noise level of image data for a higher dose scan.

10. The system of claim 8, further comprising: a weight determiner that determines adaptive weights based on the noise variance and the variation.

11. The system of claim 10, further comprising:
a projection domain de-noiser that employs the weights to de-noise the projection data.

12. The system of claim 11, wherein the adaptive weights de-noise projection data having a lower local noise variance and a higher local variation less than projection data having a higher local noise variance and a lower local variation.

13. The system of claim 12, wherein the local aggressiveness of the de-noising that is based on the local noise variance and on the local variation varies strongly between different regions in the projection domain.

14. The system of claim 8, further comprising:
a de-noising factor generator that determines a decrease in the noise variance of the projection data for the lower dose scan due to de-noising;
a low-dose scan projection domain noise variance estimator that estimates a second noise variance of the projection data for the lower dose scan before the de-noising;
a projection variance estimator that estimates a projection variance for the lower dose scan based on the noise variance determined by the noise variance estimator and a de-noising factor determined by the de-noising factor determiner;
a high-dose scan projection domain projection noise variance estimator that estimates a projection variance for the higher dose scan;
an image noise estimator that estimates an image noise variance for the projection de-noised lower dose scan and for the higher dose scan; and
an image domain de-noiser that de-noises the image data based on the image noise variances for the lower and higher dose scans.

15. The system of claim 14, wherein the de-noising factor takes into account detector crosstalk.

16. The system of claim 14, wherein the de-noising factor is generated for a subset of projections.

17. A non-transitory computer readable storage medium encoded with computer executable instructions, which, when executed by a processor of a computer, cause the processor to:
estimate a noise variance of projection data for a lower dose scan;
de-noise the projection data in the projection domain;
determine a decrease in noise variance of the projection data for the lower dose scan due to the de-noising;
determine a de-noising factor from a subset of the projection data;
estimate a projection variance for the lower dose scan based on the noise variance and the de-noising factor;
estimates a projection variance for a higher dose scan;
reconstruct the de-noised projection data and generate image data:
estimate an image noise variance for the projection de-noised lower dose scan and for the higher dose scan; and
de-noise the image data based on the image noise variances for the lower and higher dose scans.

18. The non-transitory computer readable storage medium of claim 17, wherein wherein the de-noising factor takes into account detector crosstalk.

19. The non-transitory computer readable storage medium of claim 17, wherein the de-noising factor is generated for a subset of projections.

20. The non-transitory computer readable storage medium of claim 17, wherein a noise level of the de-noised image data is the same as an estimated image data noise level of image data for a higher dose scan.

* * * * *